(12) United States Patent
Senda et al.

(10) Patent No.: US 10,838,740 B2
(45) Date of Patent: Nov. 17, 2020

(54) INFORMATION PROCESSING APPARATUS AND STARTUP METHOD

(71) Applicants: Shigeya Senda, Shizuoka (JP); Kazuma Koike, Kanagawa (JP)

(72) Inventors: Shigeya Senda, Shizuoka (JP); Kazuma Koike, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 114 days.

(21) Appl. No.: 16/366,249

(22) Filed: Mar. 27, 2019

(65) Prior Publication Data

US 2019/0303173 A1 Oct. 3, 2019

(30) Foreign Application Priority Data

Mar. 30, 2018 (JP) ................................ 2018-068494
Jul. 30, 2018 (JP) ................................ 2018-142987

(51) Int. Cl.
 G06F 9/44 (2018.01)
 H04N 1/00 (2006.01)
 G06F 9/4401 (2018.01)

(52) U.S. Cl.
 CPC ....... *G06F 9/4418* (2013.01); *H04N 1/00896* (2013.01)

(58) Field of Classification Search
 CPC .......................... G06F 9/4418; H04N 1/00896
 See application file for complete search history.

(56) References Cited

U.S. PATENT DOCUMENTS

| | | | | |
|---|---|---|---|---|
| 6,101,601 | A * | 8/2000 | Matthews | G06F 9/4418 707/999.01 |
| 7,627,728 | B1 * | 12/2009 | Roeck | G06F 11/203 711/162 |
| 7,765,413 | B2 | 7/2010 | Senda | |
| 8,438,377 | B2 | 5/2013 | Senda | |
| 8,782,388 | B2 | 7/2014 | Senda | |
| 2010/0191707 | A1 * | 7/2010 | Kokhan | G06F 16/16 707/649 |

FOREIGN PATENT DOCUMENTS

| | | |
|---|---|---|
| JP | 2009-259197 | 11/2009 |
| JP | 2010-098533 | 4/2010 |
| JP | 2013-134754 | 7/2013 |
| JP | 5895385 | 3/2016 |
| JP | 2017-102584 | 6/2017 |

* cited by examiner

*Primary Examiner* — Stefan Stoynov
(74) *Attorney, Agent, or Firm* — IPUSA, PLLC

(57) ABSTRACT

An information processing apparatus for performing hibernation startup is provided. The information processing apparatus includes a selecting unit that selects snapshot creation startup or snapshot startup; a startup unit that initiates startup processes of one or more applications when the snapshot creation startup is selected; the applications, which send notifications after the startup processes have progressed to respective points in time for snapshot creation; a creation instructing unit that sends an instruction to create a snapshot after receiving the notifications from all the applications; a creating unit that creates the snapshot based on the instruction; a memory that stores the snapshot; and a startup instructing unit that reads the snapshot stored in the memory when the snapshot startup is selected, and sends, to the applications, an instruction to resume the startup processes subsequent to the respective points in time, so as to complete the startup processes of the applications.

9 Claims, 16 Drawing Sheets

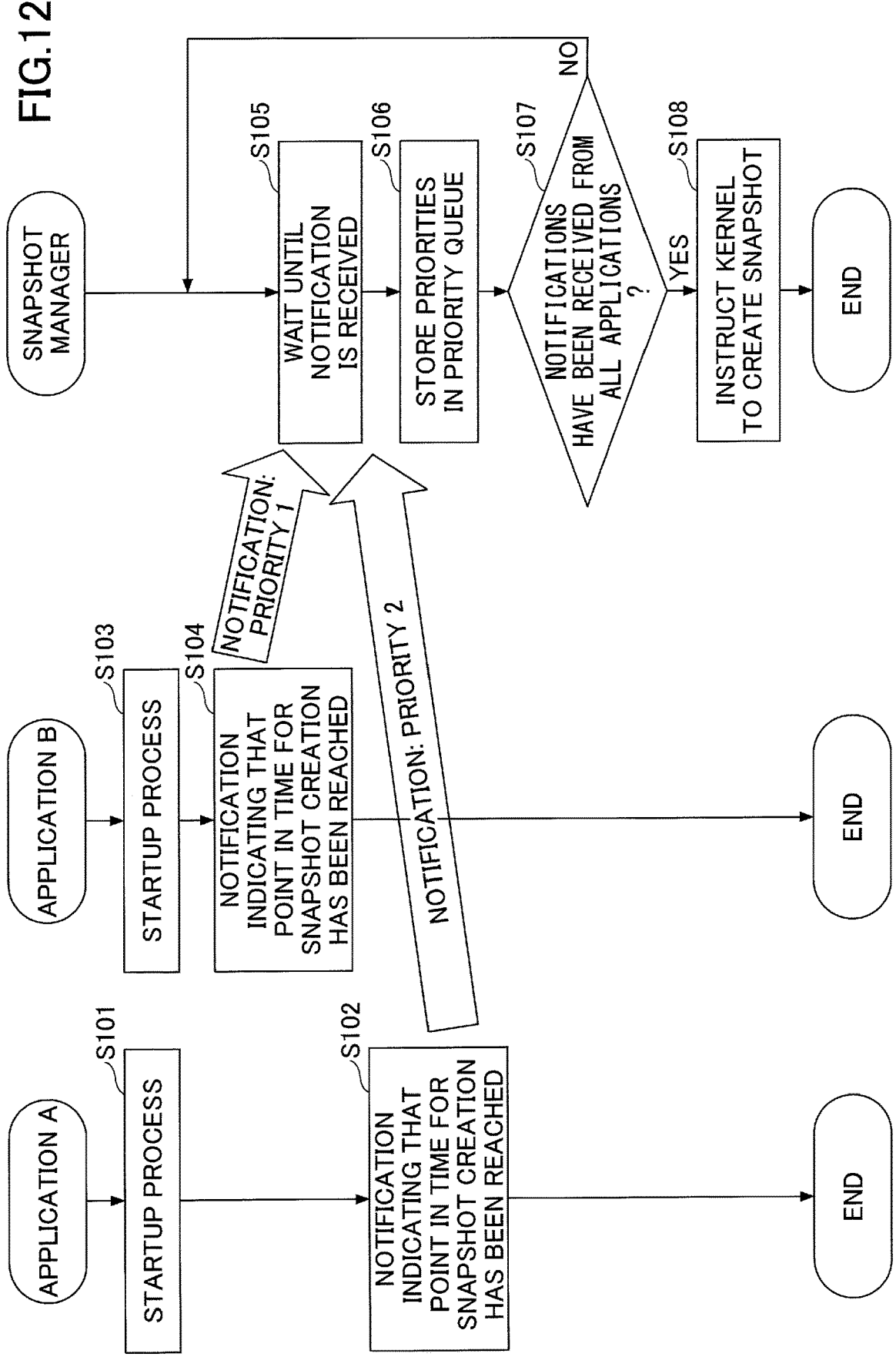

FIG.13A

PRIORITY HIGHER ↑ PRIORITY LOWER

| PRIORITY | NUMBER OF APPLICATIONS |
|---|---|
| 0 | 0 |
| 1 | 1 |
| 2 | 1 |
| 3 | 0 |

FIG.13B

| APPLICATION IDENTIFICATION INFORMATION | PRIORITY |
|---|---|
| APPLICATION A | 1 |
| APPLICATION B | 2 |
| APPLICATION C | 2 |

FIG.13C

| APPLICATION IDENTIFICATION INFORMATION | STARTUP CONDITION |
|---|---|
| APPLICATION A | NOT APPLICABLE |
| APPLICATION B | START APPLICATION A |
| APPLICATION C | START APPLICATION A |

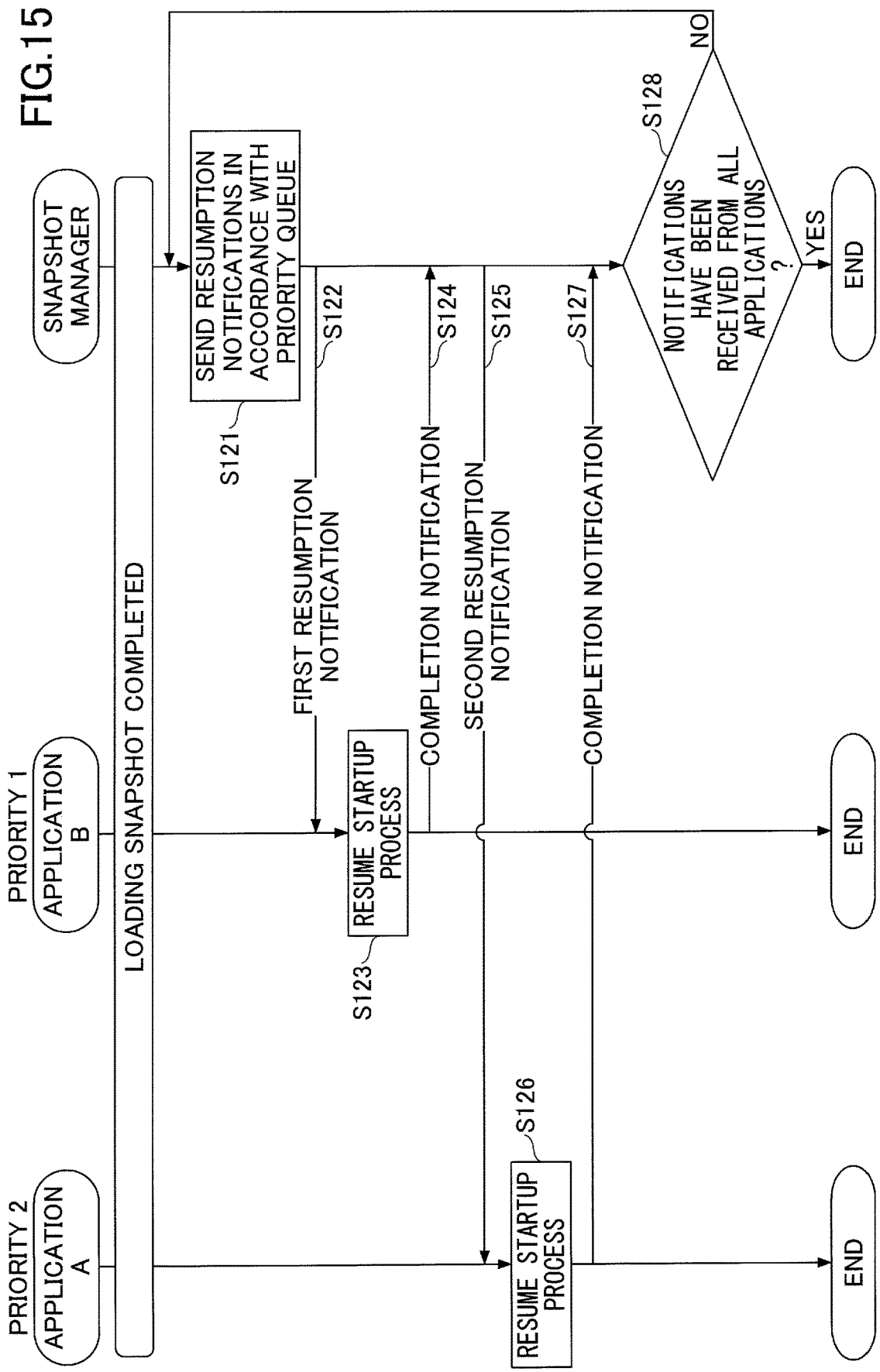

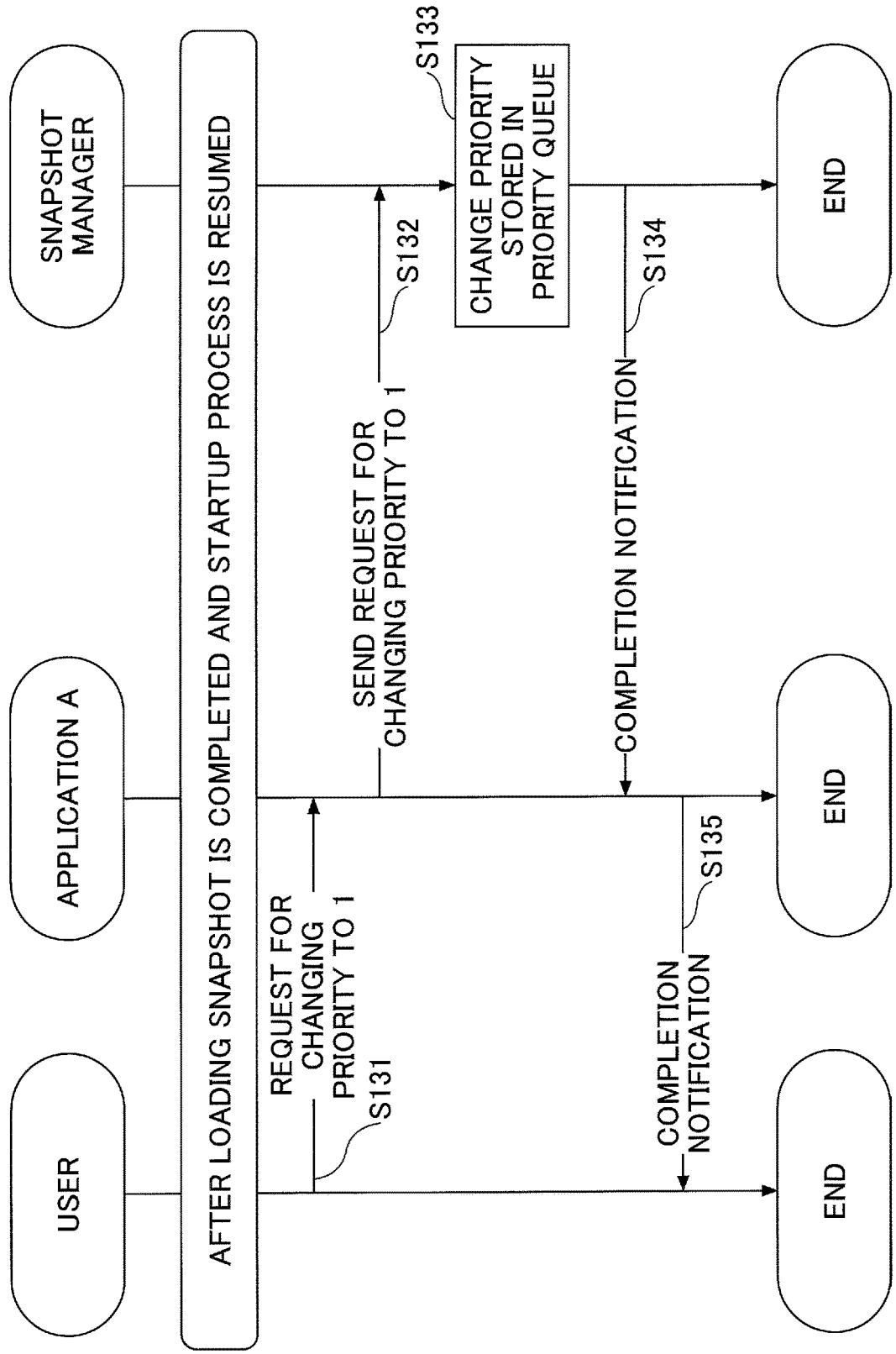

INFORMATION PROCESSING APPARATUS AND STARTUP METHOD

CROSS-REFERENCE TO RELATED APPLICATION

The present application claims priority under 35 U.S.C. § 119 to Japanese Patent Application No. 2018-068494, filed on Mar. 30, 2018, and Japanese Patent Application No. 2018-142987, filed on Jul. 30, 2018, the entire contents of which are incorporated herein by reference.

BACKGROUND OF THE INVENTION

1. Field of the Invention

The disclosures herein generally relate to an information processing apparatus and a startup method.

2. Description of the Related Art

Conventionally, a method called hibernation that enables power saving and fast startup of an information processing apparatus is known.

In hibernation, an information processing apparatus is shut down after data called a snapshot is created and is stored into a non-volatile storage medium. The snapshot contains information related to a running state of the information processing apparatus, including hardware settings such as a CPU and contents of a memory. At the next startup, the information processing apparatus uses the snapshot (snapshot image) stored in the non-volatile storage medium to restore the running state before the shutdown. Hibernation allows a system to be suspended while in operation and also enables fast startup and resumption (see Patent Document 1, for example).

In conventional hibernation, a hibernation snapshot is created before a shutdown. However, conventional hibernation takes time to create a snapshot, and is thus not suitable for information processing apparatuses that require fast shutdowns. Accordingly, in such an information processing apparatus that requires a fast shutdown, a method for preliminarily creating a snapshot is conceived such that the need to create a snapshot before a shutdown is eliminated.

However, the above information processing apparatus that employs the method for preliminarily creating a snapshot has a problem in that, when an environment is changed, for example, when the presence or absence or an enabled state or a disabled state of a peripheral device is changed after a snapshot is created, the information processing apparatus fails to flexibly respond to such changes.

RELATED-ART DOCUMENTS

Patent Documents

[Patent Document 1] Japanese Unexamined Patent Application Publication No. 2017-102584

SUMMARY OF THE INVENTION

According to at least one embodiment, an information processing apparatus for performing hibernation startup is provided. The information processing apparatus includes a selecting unit configured to select snapshot creation startup or snapshot startup; a startup unit configured to initiate startup processes of one or more applications when the snapshot creation startup is selected; the one or more applications, configured to send notifications after the startup processes have progressed to respective points in time for snapshot creation, the respective points in time being set during the startup processes; a creation instructing unit configured to send an instruction to create a snapshot after receiving the notifications from all of the one or more applications; a creating unit configured to create the snapshot based on the instruction; a memory configured to store the snapshot; and a startup instructing unit configured to read the snapshot stored in the memory when the snapshot startup is selected, and configured to send, to the one or more applications, an instruction to resume the startup processes subsequent to the respective points in time, so as to complete the startup processes of the one or more applications.

BRIEF DESCRIPTION OF THE DRAWINGS

FIG. 3 is a flowchart illustrating an example of a startup process performed when the power is turned on;

FIG. 12 is a flowchart illustrating another example of an application startup process in step S25;

FIGS. 13A through 13C are diagrams illustrating examples of priority queues;

FIG. 15 is a flowchart illustrating another example of a continuation process performed in step S85; and FIG. 16 is a flowchart illustrating an example of a process for changing priority.

DESCRIPTION OF THE PREFERRED EMBODIMENTS

It is a general object of at least one embodiment of the present invention to provide an information processing apparatus that can flexibly respond to environment changes at the time of hibernation startup from a preliminarily created snapshot.

In the following, embodiments of the present invention will be described with reference to the accompanying drawings. In the embodiments, an example in which an information processing apparatus, which functions as an operation unit of an image processing apparatus, performs hibernation startup will be described. The image processing apparatus is an example of embedded equipment, and may be a multi-function peripheral (MFP); however, the information processing apparatus is not limited thereto. For example, the image processing apparatus may be a portable terminal such as a main body 2 of the MFP, an electronic whiteboard, a projector, a personal computer, a smartphone, and a tablet terminal.

First Embodiment

<Hardware Configuration>

Figure 1:
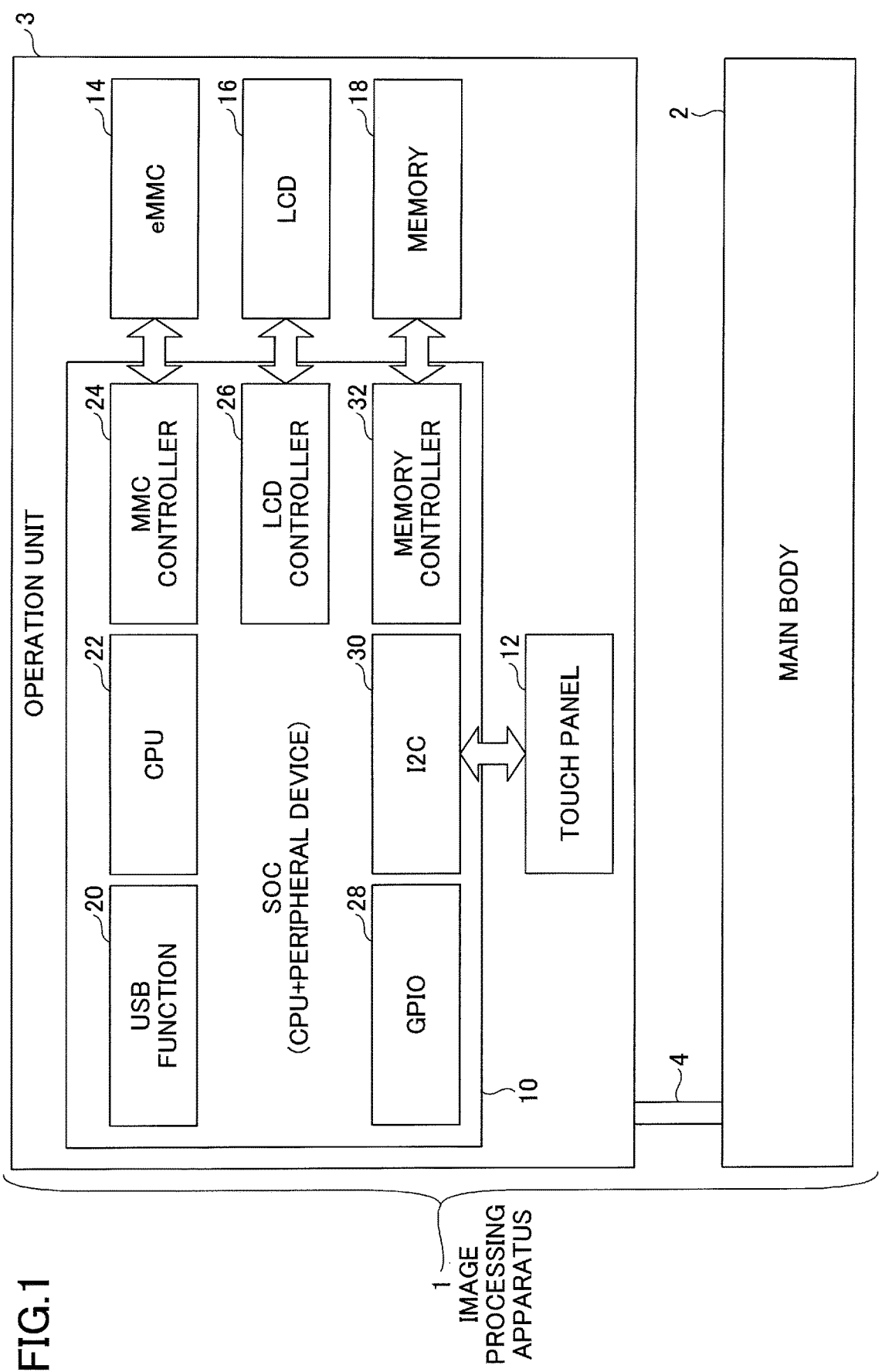
FIG. 1 is a diagram illustrating a configuration example of an image processing apparatus according to an embodiment.

FIG. 1 is a diagram illustrating a configuration example of an image processing apparatus according to a first embodiment. An image processing apparatus 1 of FIG. 1 includes a main body 2 and an operation unit 3. The main body 2 and the operation unit 3 are connected to each other via a cable 4 so as to enable data communication. Instead of the wired connection via the cable 4, a wireless connection (including an infrared connection) may be used to connect the main body 2 and the operation unit 3 to each other. The main body 2 reads a document by a scanner device and prints the document to paper by using a plotter device, as controlled by a main body controller.

The operation unit 3 includes a system-on-a-chip (SOC) 10, a touch panel 12, an embedded multi-media card (eMMC) 14, a liquid crystal display (LCD) 16, and a memory 18. The SOC 10 includes, on one chip, a universal serial bus (USB) function 20, a central processing unit (CPU) 22, a MMC controller 24, a LCD controller 26, a general-purpose input/output (GPIO) 28, an inter-integrated circuit (I²C) 30, and a memory controller 32.

The SOC 10 is designed to function as a system of the operation unit 3. The SOC 10 is configured to boot from the eMMC 14, which is an embedded multi-media card, and the system boots from a bootloader stored in a specific area of the eMMC 14. The bootloader loads a kernel and a root file system that are on a file partition of the eMMC 14, so as to start the kernel.

The operation unit 3 according to the present embodiment performs snapshot creation startup or snapshot startup as will be described later. At the time of snapshot creation startup, which will be described later, after the kernel is started, the operation unit 3 creates a snapshot and stores the snapshot in the eMMC 14, which is a non-volatile storage medium.

At the time of snapshot startup, which will be described later, after the kernel is started, the operation unit 3 loads the snapshot stored in the eMMC 14 into the memory 18, and performs hibernation startup. The image processing apparatus 1 according to the present embodiment performs snapshot creation startup before shipment from a factory, and stores a snapshot in the eMMC 14. Then, after shipment from the factory, the image processing apparatus 1 according to the present embodiment performs snapshot startup at normal power-on. Accordingly, the image processing apparatus 1 of the present embodiment does not experience a situation where a shutdown is not readily completed due to creation of a snapshot.

The touch panel 12 receives an operation from a user. The LCD 16 displays information. The memory 18 is an example of a volatile storage medium that temporarily stores programs and data. The CPU 22 controls the operation unit 3 and implements functions of the operation unit 3 by loading a program and data from a storage medium such as the eMMC 14 into the memory 18 and performing a process.

It is noted that the main body 2 and the operation unit 3 may be placed in different casings, as illustrated in FIG. 1, or may be provided in the same casing. For example, when the operation unit 3 is placed in a casing different from a casing of the main body 2 and is wirelessly connected to the main body 2, the operation unit 3 can be used while remaining separated from the main body 2.

<Software Configuration>

Figure 2:
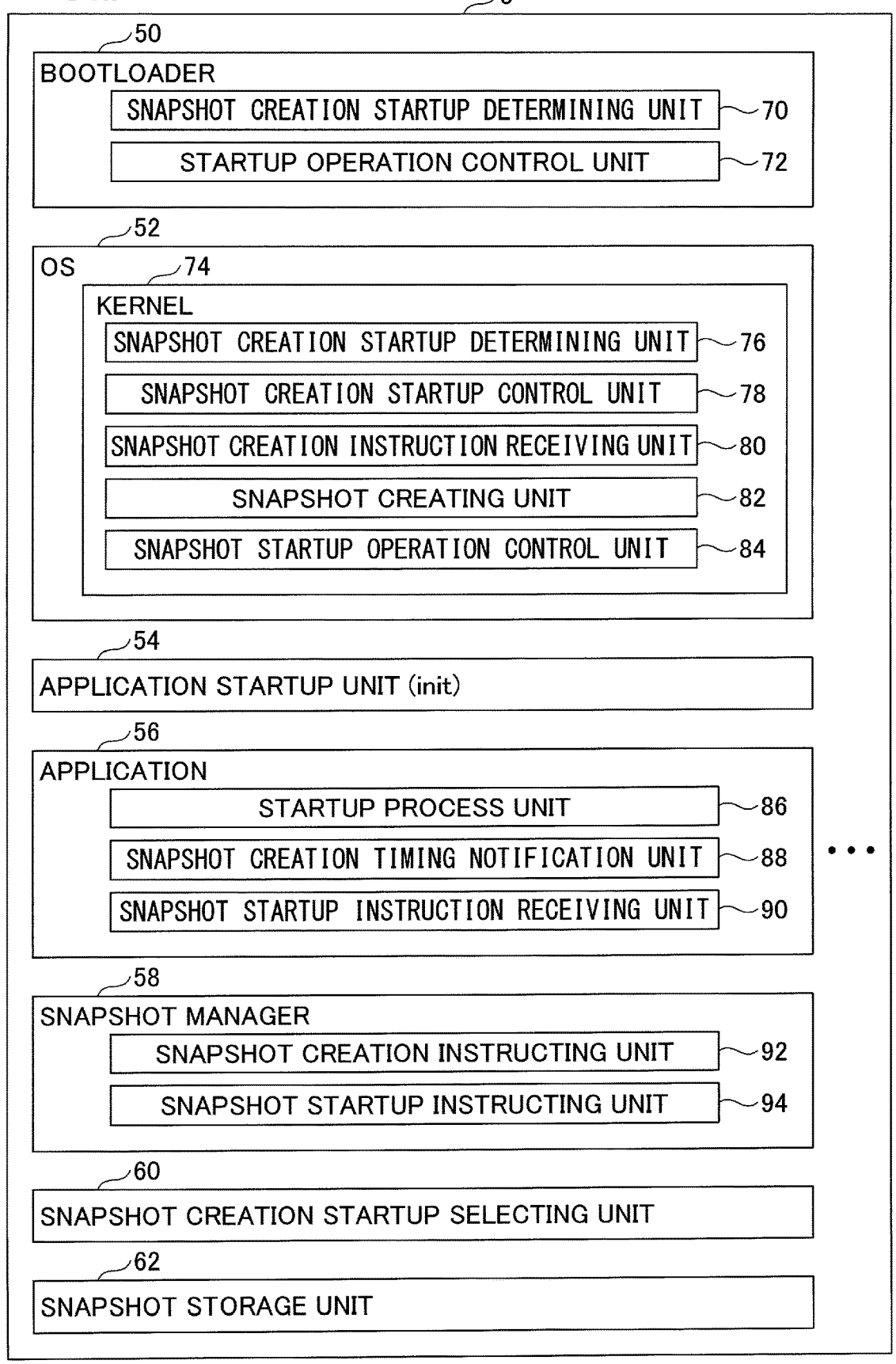
FIG. 2 is a diagram illustrating an example of a functional configuration of an operation unit according to the embodiment.

The operation unit 3 according to the embodiment can implement various functions as illustrated in FIG. 2 by executing a program on the hardware illustrated in FIG. 1, for example. FIG. 2 is a diagram illustrating an example of a functional configuration of the operation unit according to the present embodiment. The operation unit 3 illustrated in FIG. 2 implements a bootloader 50, an operating system (OS) 52, an application startup unit 54, one or more applications 56, a snapshot manager 58, a snapshot creation startup selecting unit 60, and a snapshot storage unit 62.

The bootloader 50 includes a snapshot creation startup determining unit 70 and a startup operation control unit 72. The snapshot creation startup determining unit 70 determines whether startup at power-on is snapshot creation startup or snapshot startup. The startup operation control unit 72 controls a startup operation based on the determination by the snapshot creation startup determining unit 70.

The OS 52 includes a kernel 74. Also, the kernel 74 includes a snapshot creation startup determining unit 76, a snapshot creation startup control unit 78, a snapshot creation instruction receiving unit 80, a snapshot creating unit 82, and a snapshot startup operation control unit 84.

The snapshot creation startup determining unit 76 determines whether startup at power-on is snapshot creation startup or snapshot startup. When it is determined that the startup is snapshot creation startup, the snapshot creation startup control unit 78 controls an operation of the snapshot creation startup.

The snapshot creation instruction receiving unit 80 receives an instruction to create a snapshot from the snapshot manager 58. When the snapshot creation instruction receiving unit 80 receives an instruction to create a snapshot from the snapshot manager 58, the snapshot creating unit 82 creates a snapshot. When it is determined that the startup is snapshot startup, the snapshot startup operation control unit 84 controls an operation of the snapshot startup.

The application startup unit 54 is implemented by, for example, "init". The application startup unit 54 starts the one or more applications 56 in accordance with setting files such as "init.rc", which is the first process performed after the kernel is started. Each of the applications 56 includes a startup process unit 86, a snapshot creation timing notification unit 88, and a snapshot startup instruction receiving unit 90.

The startup process unit 86 performs an application startup process. By design, the snapshot creation timing notification unit 88 has a timing at which a snapshot is to be created (hereinafter referred to as a point in time for snapshot creation). The point in time for snapshot creation is a point in time between the start and the end of the startup process. The snapshot creation timing notification unit 88 sends a notification to the snapshot manager 58 at the timing when the startup process reaches the point in time for snapshot creation. In other words, the point in time for snapshot creation is a state in which or a timing at which a predetermined process of a plurality of processes included in the startup process is completed. In the following, "a state in which the predetermined process is completed" or "a timing at which the predetermined process is completed" may be expressed as "the point in time for snapshot creation is reached" or "the point in time for snapshot creation is passed". The startup process unit 86 stops the startup process when the startup process reaches the point in time for snapshot creation. Also, when snapshot startup is performed, the snapshot startup instruction receiving unit 90 receives a snapshot startup instruction from the snapshot manager 58, and performs a continuation process for resuming the startup process subsequent to the point in time for snapshot creation.

The snapshot manager 58 includes a snapshot creation instructing unit 92 and a snapshot startup instructing unit 94. When the snapshot creation instructing unit 92 receives, from all the applications 56, notifications indicating that the points in time for snapshot creation have been reached, the snapshot creation instructing unit 92 instructs the kernel 74 to create a snapshot.

At the time of snapshot startup, the snapshot startup instructing unit 94 sends snapshot startup instructions to the applications 56.

It is noted that the snapshot manager 58 may identify the applications 56 installed on the operation unit 3, by reading information stored in a storage unit such as the eMMC 14, or by referring to a program that controls the installation status of the applications 56. Alternatively, the snapshot manager 58 may identify only a necessary application 56 to create a snapshot, from a plurality of applications installed on the operation unit 3. In this case, when the snapshot creation instructing unit 92 receives, from the identified application 56, a notification indicating that a startup process has reached the point in time for snapshot creation, the snapshot creation instructing unit 92 instructs the kernel 74 to create a snapshot. Subsequently, at the time of snapshot startup, the snapshot startup instructing unit 94 sends a snapshot startup instruction to the identified application.

The snapshot creation startup selecting unit 60 selects whether startup at power-on is snapshot creation startup or snapshot startup. For example, the snapshot creation startup selecting unit 60 may use a DIP switch connected to the GPIO 28 to select whether startup at power-on is snapshot creation startup or snapshot startup. However, a method for selecting snapshot creation startup or snapshot startup is not limited thereto. For example, the snapshot creation startup selecting unit 60 may determine whether startup of the operation unit 3 is initial startup based on flag information stored on the storage unit. When it is determined that the startup is initial startup, the snapshot creation startup selecting unit 60 may select snapshot creation startup, and when it is determined that the startup is not initial startup, the snapshot creation startup selecting unit 60 may select snapshot startup. A snapshot created by the snapshot creating unit 82 is stored in the snapshot storage unit 62.

<Details of Process>

Figure 3:
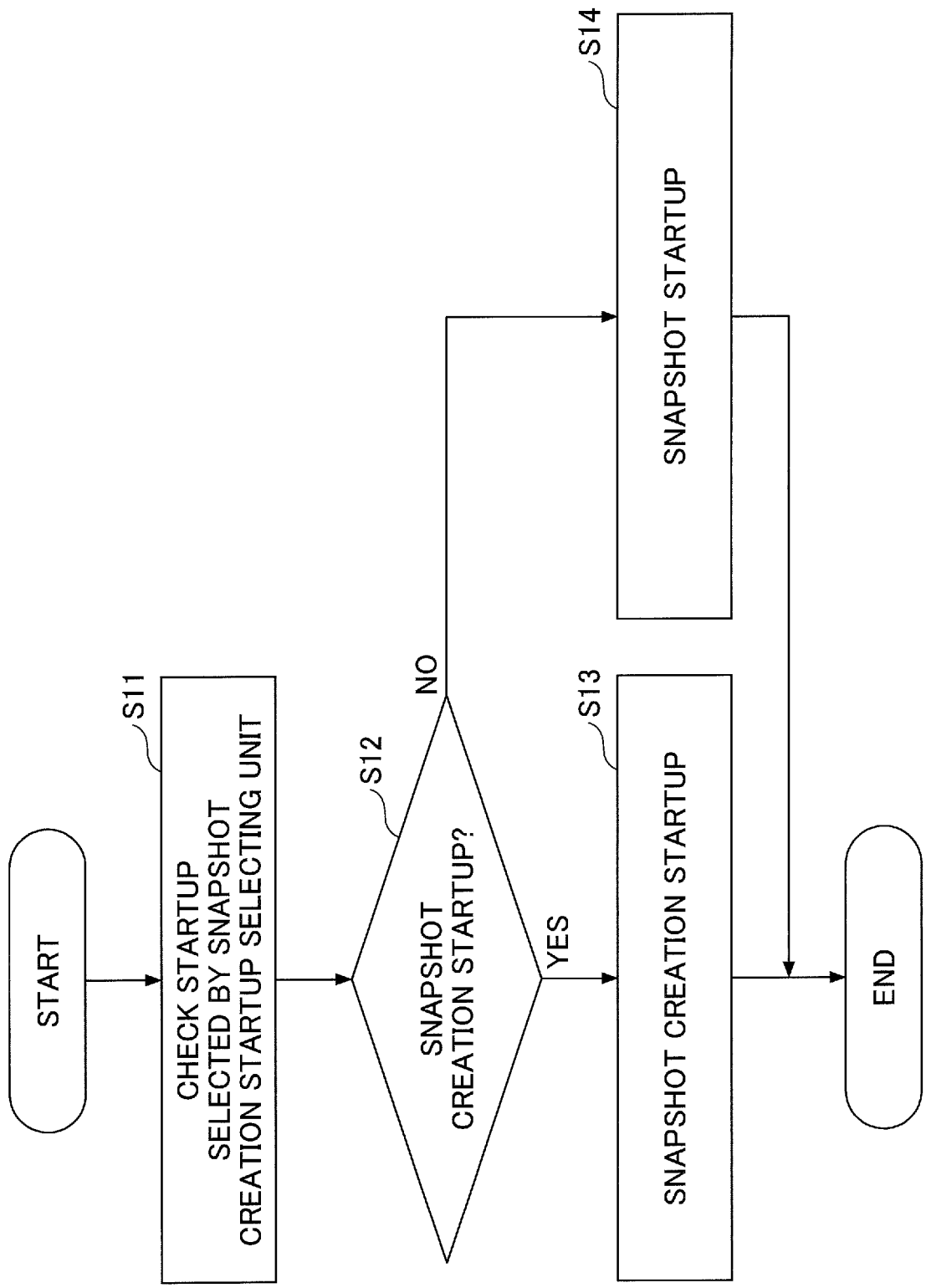

The operation unit 3 according to the present embodiment performs a startup process when the power is turned on, by following a procedure as illustrated in FIG. 3, for example. FIG. 3 is a flowchart illustrating an example of a startup process performed when the power is turned on.

In step S11, the operation unit 3 checks whether startup at power-on selected by the snapshot creation startup selecting unit 60 is snapshot creation startup or snapshot startup. When snapshot creation startup is selected by the snapshot creation startup selecting unit 60 (yes in S12), the operation unit 3 performs snapshot creation startup in S13. When snapshot creation startup is not selected by the snapshot creation startup selecting unit 60 (no in S12), the operation unit 3 performs snapshot startup in S14.

Figure 4:
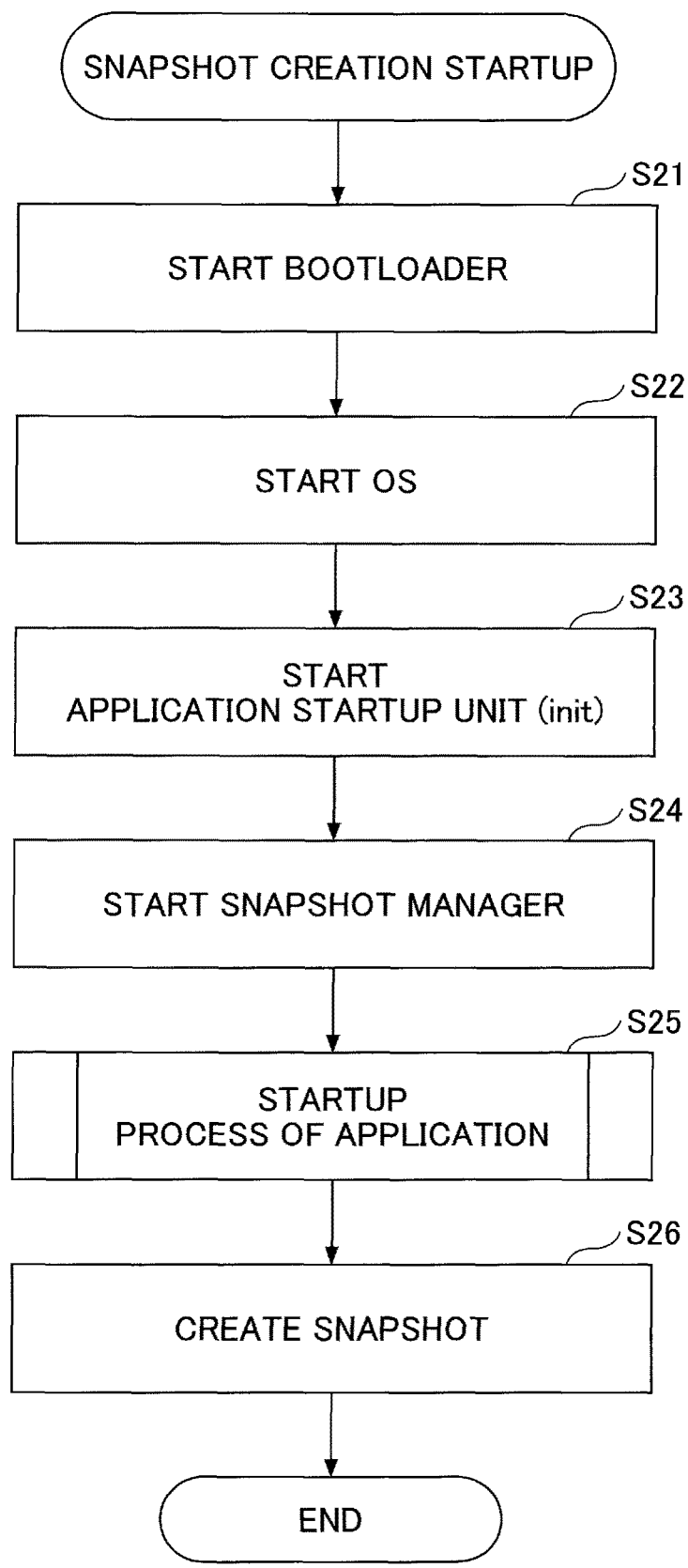
FIG. 4 is a flowchart illustrating an example of snapshot creation startup performed in step S13.

The snapshot creation startup in step S13 is performed by following a procedure as illustrated in FIG. 4, for example. FIG. 4 is a flowchart illustrating an example of snapshot creation startup performed in step S13.

In step S21, the bootloader 50 is started. The startup operation control unit 72 of the bootloader 50 starts a startup operation for snapshot creation startup. In step S22, the startup operation control unit 72 loads and starts the kernel 74 of the OS 52. The kernel 74 starts the OS 52. In step S23, the kernel 74 starts the application startup unit 54.

In step S24, the application startup unit 54 starts the snapshot manager 58 in accordance with a setting file. In step S25, in accordance with a setting file, the application startup unit 54 initiates a startup process of each of the applications 56. When the startup process of each of the applications 56 in step S25 reaches the point in time for snapshot creation, the snapshot creation instructing unit 92 of the snapshot manager 58 instructs the kernel 74 to create a snapshot. Accordingly, in step S26, the snapshot creating unit 82 of the kernel 74 creates a snapshot at the timing when the startup process of each of the applications 56 reaches the point in time for snapshot creation.

Figure 5:
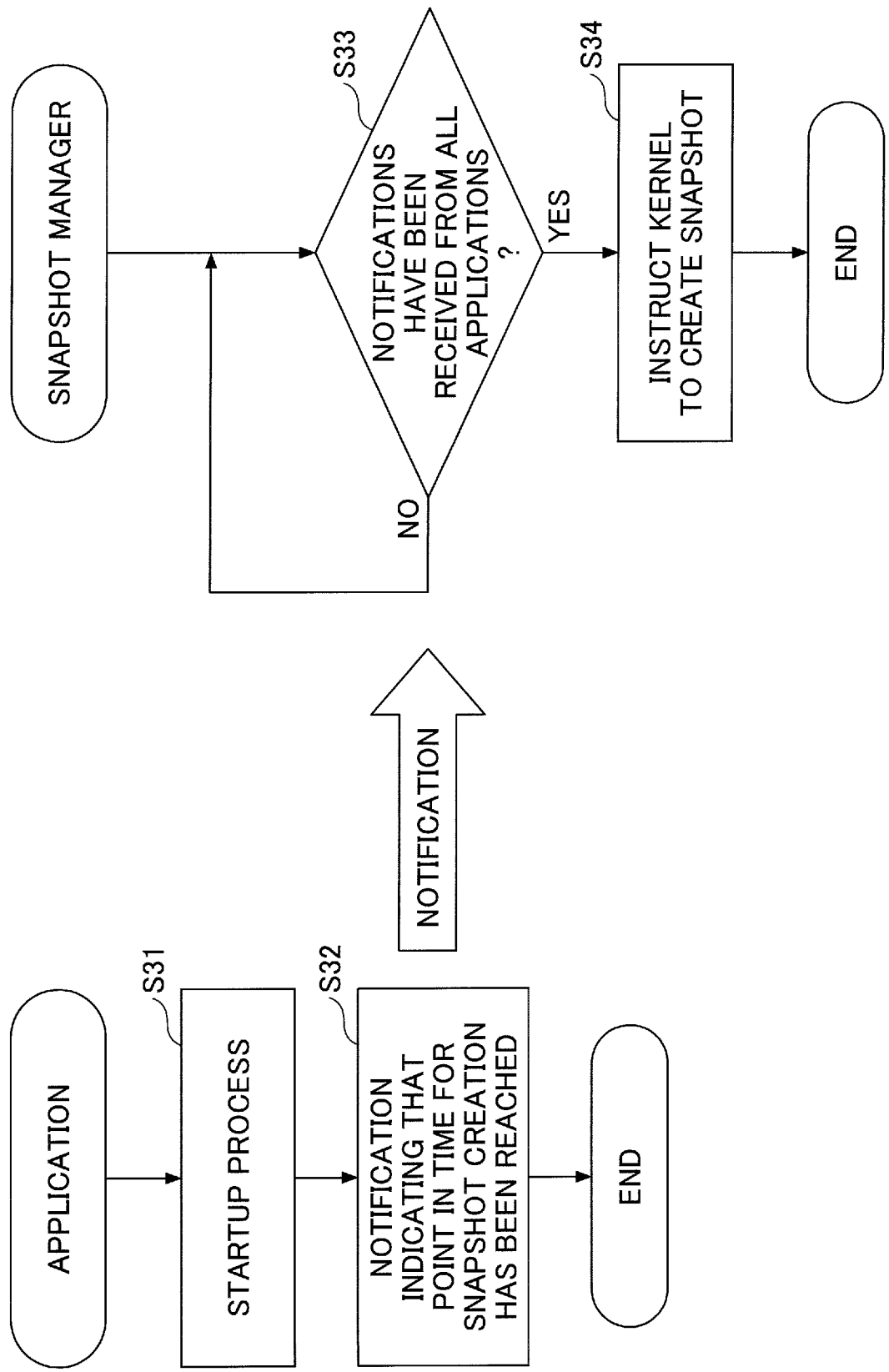
FIG. 5 is a flowchart illustrating an example of an application startup process in step S25.

The startup process of each of the applications 56 in step S25 is performed by following a procedure as illustrated in FIG. 5, for example. FIG. 5 is a flowchart illustrating an example of an application startup process in step S25.

In step S31, the startup process unit 86 starts a startup process. The startup process unit 86 proceeds with the startup process until the startup process reaches the point in time for snapshot creation. When the startup process reaches the point in time for snapshot creation, the startup process unit 86 stops the startup process. Further, when the startup process performed by the startup process unit 86 reaches the point in time for snapshot creation, the snapshot creation timing notification unit 88 sends, to the snapshot manager 58, a notification indicating that the point in time for snapshot creation has been reached in step S32.

In step S33, the snapshot creation instructing unit 92 of the snapshot manager 58 waits until the snapshot creation instructing unit 92 receives, from all the applications 56, notifications indicating that the points in time for snapshot creation have been reached. When notifications are received from all the applications 56, the snapshot creation instructing unit 92 instructs the kernel 74 to create a snapshot in step S34.

At the timing when the snapshot creating unit 82 receives the instruction to create a snapshot from the snapshot manager 58, the snapshot creating unit 82 creates a snapshot. Accordingly, the operation unit 3 of the present embodiment can stably create a snapshot when startup processes of all the applications 56 have reached the points in time for snapshot creation.

In the image processing apparatus 1 according to the present embodiment, it is desirable to eliminate unnecessary device driver processes when snapshot creation startup is performed. In the image processing apparatus 1 according to the present embodiment, devices are enabled in accordance with the actual environment at the time of snapshot startup, thereby maintaining consistency between when a snapshot is created and startup from the snapshot is performed.

In light of the above, an investigation was conducted on each device driver of the image processing apparatus 1 according to the present embodiment, such that a device configuration and a device driver configuration at the time of snapshot creation startup do not depend on enabled or disabled states of devices included in the image processing apparatus 1. In the image processing apparatus 1 according to the present embodiment, a device process included in the bootloader startup as in step 21 is made different between snapshot creation startup and snapshot startup, which will be described below.

Further, in the image processing apparatus 1 according to the embodiment, a device driver process included in the OS startup as in step S22 is made different between snapshot creation startup and snapshot startup, which will be described below.

Figure 6C:
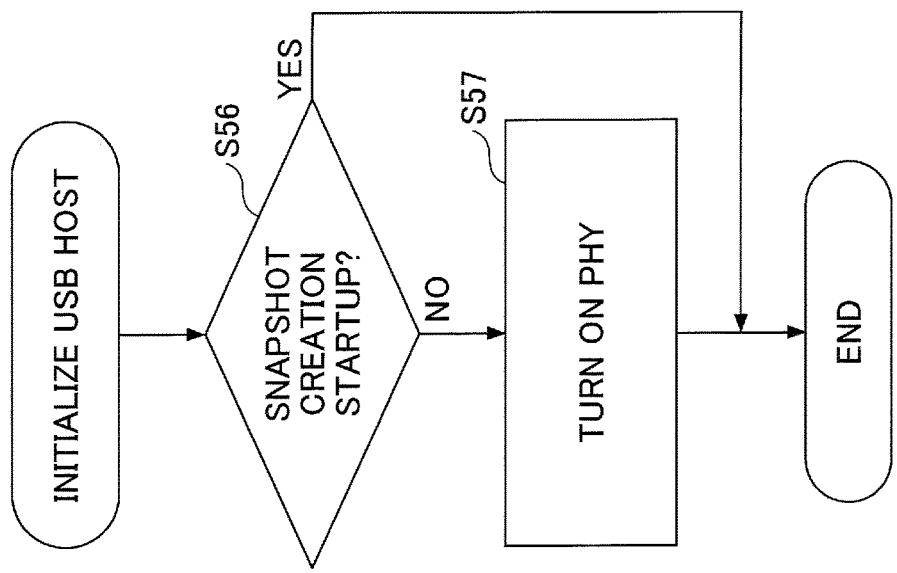
FIGS. 6A through 6O are flowcharts illustrating an example of starting a bootloader in step S21.
Figure 6B:
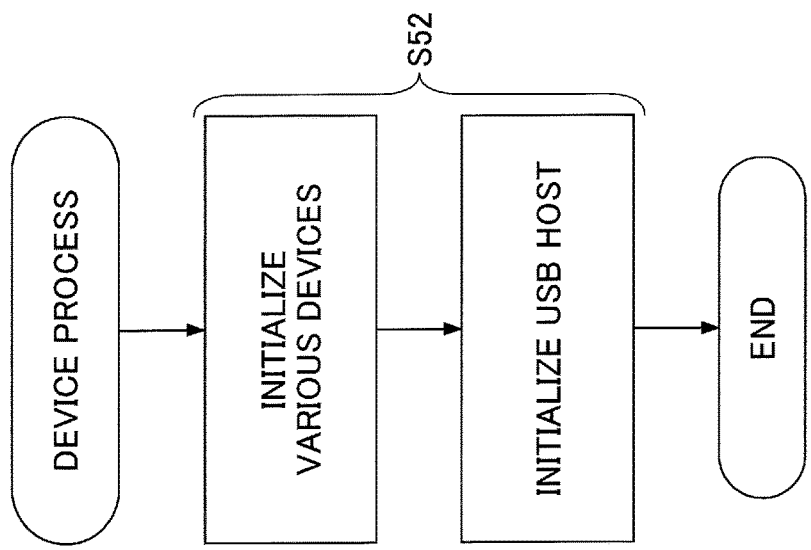
Figure 6A:
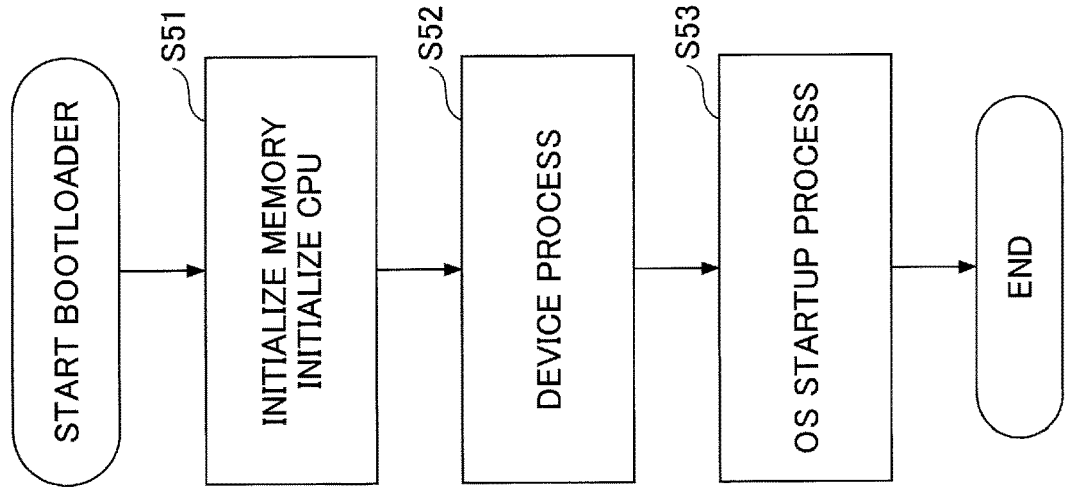

FIGS. 6A through 6C are flowcharts illustrating an example of starting the bootloader in step S21. In the flowcharts illustrated in FIGS. 6A through 6C, at the time of snapshot creation startup, a PHY chip of a hub is not turned on, such that a connected USB device is not physically detected. By not turning on the PHY chip, a USB host driver itself can be in an initialized state. When snapshot startup is performed, the connected USB device can be detected by turning on the PHY chip of the hub.

In step S51, the startup operation control unit 72 of the bootloader 50 initializes the memory 18 and the CPU 22. In step S52, the startup operation control unit 72 performs a device process, which will be described later. In step S53, the bootloader 50 starts an OS startup process.

In the device process in step S52, the startup operation control unit 72 initializes various devices including the USB host. In step S56, when the USB host is initialized, the startup operation control unit 72 determines whether snapshot creation startup is performed. When it is determined that snapshot creation startup is performed, the PHY chip is not turned on such that the USB device is not physically detected.

When it is determined that snapshot creation startup is not performed, the startup operation control unit 72 turns on the PHY chip of the hub in step S57, such that the connection of the USB device can be detected. The power of the PHY chip of the hub of the USB host can be controlled by simply turning on and off the power. Thus, the bootloader 50 performs the power control of the PHY chip.

Figure 7C:
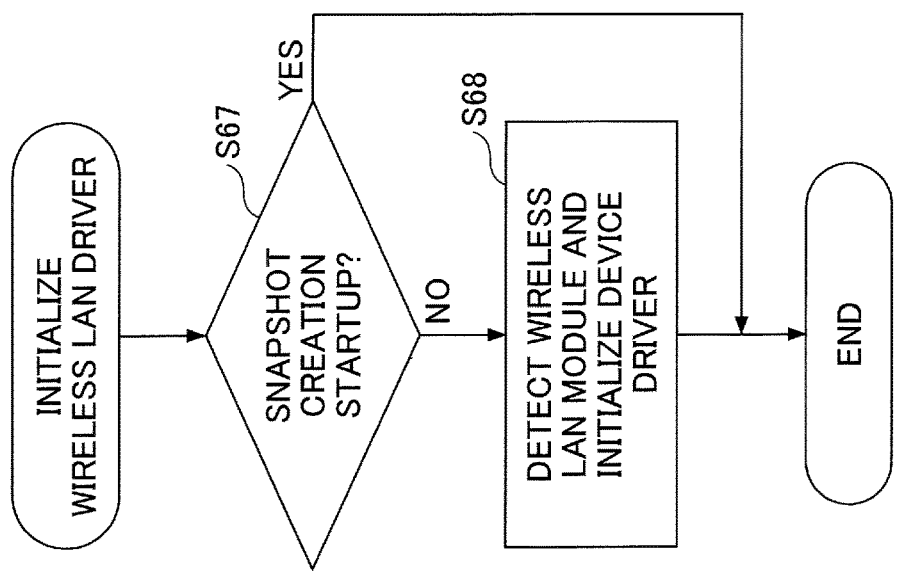
FIGS. 7A through 7C are flowcharts illustrating an example of starting an OS in step S22.
Figure 7B:
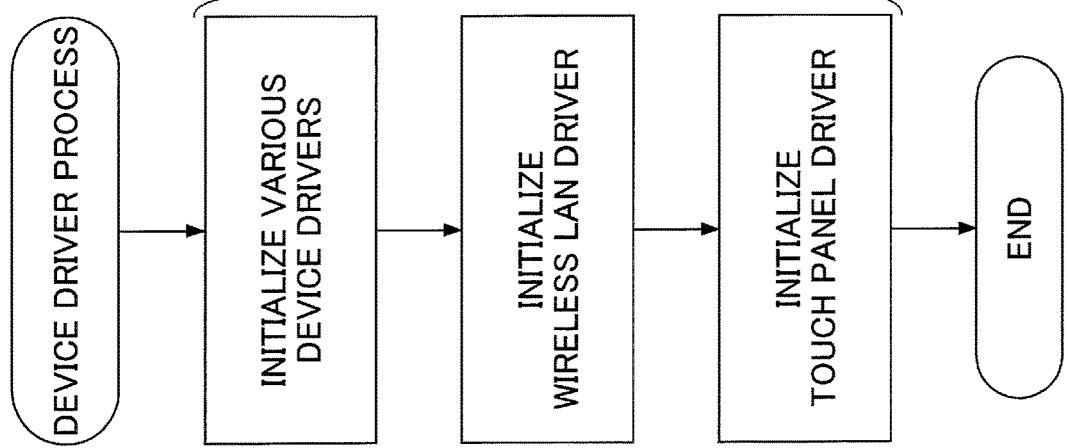
Figure 7A:
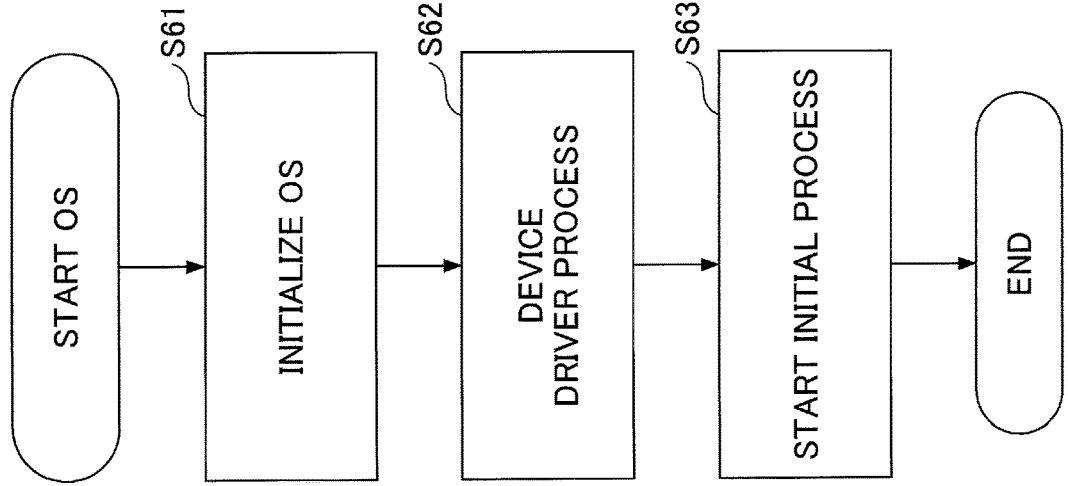

FIGS. 7A through 7C are flowcharts illustrating an example of starting the OS in step S22. For example, in the flowcharts illustrated in FIGS. 7A through 7C, at the time of snapshot creation startup, power is not supplied to a wireless LAN module such that the device drivers become not enabled. Also, at the time of snapshot startup, power is supplied to the wireless LAN module such that the device drivers become enabled.

In step S61, the kernel 74 initializes the OS 52. In step S62, the kernel 74 performs a device driver process, which will be described later. In step S63, the kernel 74 starts an initial process.

In the device driver process in step S62, the kernel 74 initializes various device drivers including a wireless LAN driver and a touch panel driver. When the wireless LAN driver is initialized, it is determined whether snapshot creation startup is performed in step S67. When it is determined that snapshot creation startup is performed, power is not supplied to the wireless LAN module such that the wireless LAN driver becomes not enabled.

When it is determined that snapshot creation startup is not performed, the kernel 74 supplies power to the wireless LAN module, such that the wireless LAN module is detected and the device driver is initialized and enabled in step S68.

Further, in the flowcharts illustrated in FIGS. 7A through 7C, input detection of the touch panel 12 is disabled at the time of snapshot creation startup. At the time of snapshot startup, input detection of the touch panel 12 is enabled. In step S62, the touch panel driver is initialized by following a flowchart as illustrated in FIG. 8, for example.

Figure 8:
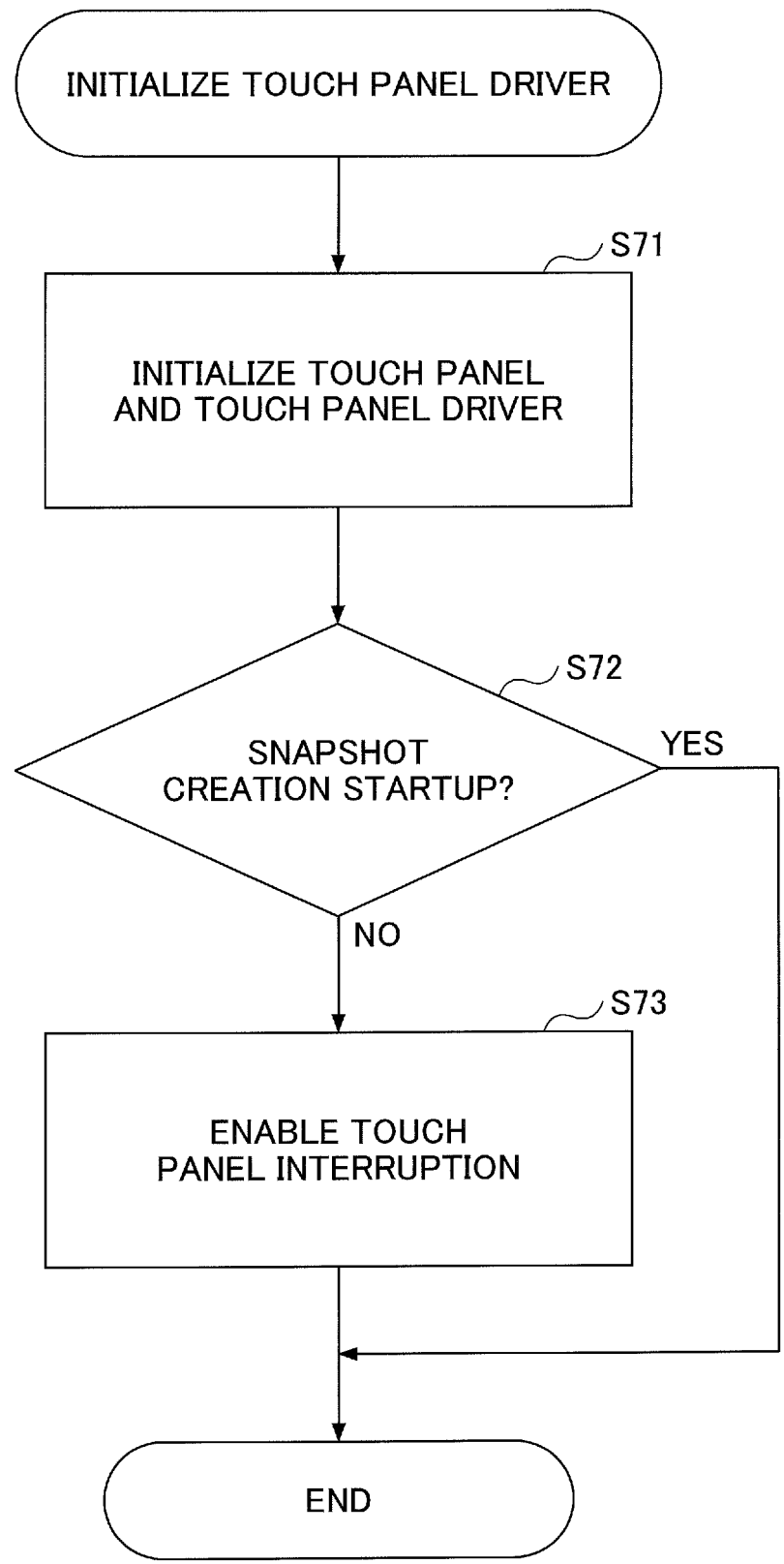
FIG. 8 is a flowchart illustrating an example of initializing a touch panel driver in step S62.

FIG. 8 is a flowchart illustrating an example of initializing the touch panel driver in step S62. In step S71, the kernel 74 initializes the touch panel 12 and the touch panel driver. At the initialization of the touch panel 12, it is determined whether snapshot creation startup is performed in step S72. When it is determined that snapshot creation startup is performed, input detection of the touch panel 12 is disabled. When it is determined that snapshot creation startup is not performed, the kernel 74 enables input detection (interruption) of the touch panel 12 in step S73. The initialization of the wireless LAN driver illustrated in FIGS. 7B and 7C and the initialization of the touch panel driver illustrated in FIG. 8 are performed by the kernel 74.

According to the bootloader startup illustrated in FIGS. 6A through 6C and the OS startup illustrated in FIGS. 7A through 7C, by processing the devices and the device drivers specific to the image processing apparatus 1, it becomes possible to create a configuration-neutral snapshot without performing an unnecessary process. For example, there may be a case where a USB-based fingerprint authentication device is optionally connected to the image processing apparatus 1.

In such a case, in the image processing apparatus 1 according to the present invention, the fingerprint authentication device is not enabled at the time of snapshot creation startup. Accordingly, a snapshot can be created without a device driver of the fingerprint authentication device being enabled. In other words, in the image processing apparatus 1 according to the present embodiment, a snapshot can be created without negative effects such as a memory being occupied by device drivers. Furthermore, in the image processing apparatus 1 according to the present embodiment, the fingerprint authentication device is enabled and becomes detectable at the time of snapshot startup. Thus, the fingerprint authentication device can be brought into an operation after performing a device consistency process and a continuation process, which will be described later.

Figure 9:
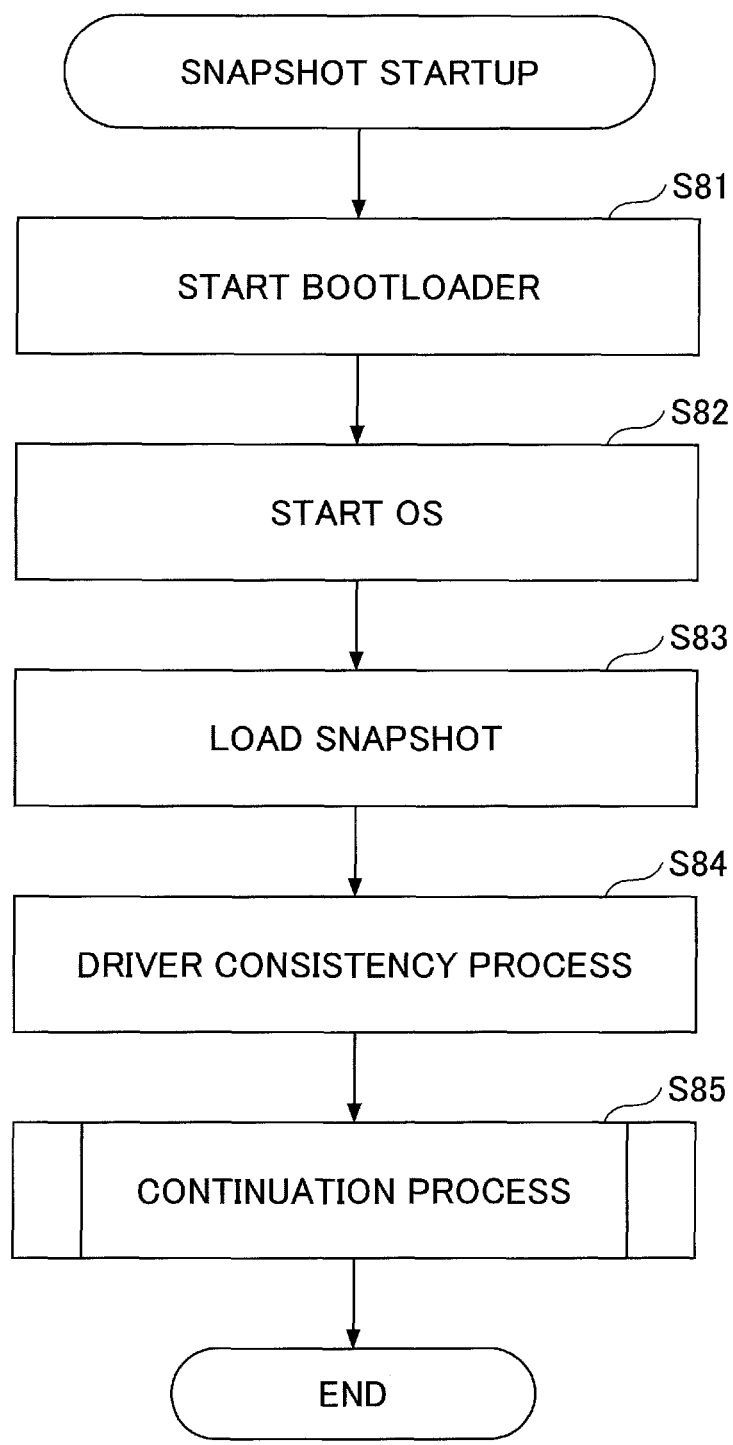
FIG. 9 is a flowchart illustrating an example of snapshot startup performed in step S14.

Snapshot startup in step S14 is performed by a procedure illustrated in FIG. 9, for example. FIG. 9 is a flowchart illustrating an example of snapshot startup performed in step S14.

In step S81, the bootloader 50 is started. The startup operation control unit 72 of the bootloader 50 performs a startup operation of snapshot startup. In step S82, the startup operation control unit 72 loads and starts the kernel 74 of the OS 52. The kernel 74 starts the OS 52.

In step S83, the snapshot startup operation control unit 84 of the kernel 74 loads a snapshot stored in the eMMC 14 into the memory 18, and performs hibernation startup. Namely, the memory 18 saved at the timing when the startup processes of the applications 56 have reached the respective points in time for snapshot creation is reproduced.

In step S84, the snapshot startup operation control unit 84 performs the driver consistency process such that consistency of functions that depend on the environment of the image processing apparatus 1 can be maintained. In step S85, the snapshot startup operation control unit 84 performs a continuation process so as to allow each of the applications 56 to continue with the startup process subsequent to the point in time for snapshot creation.

Figure 10:
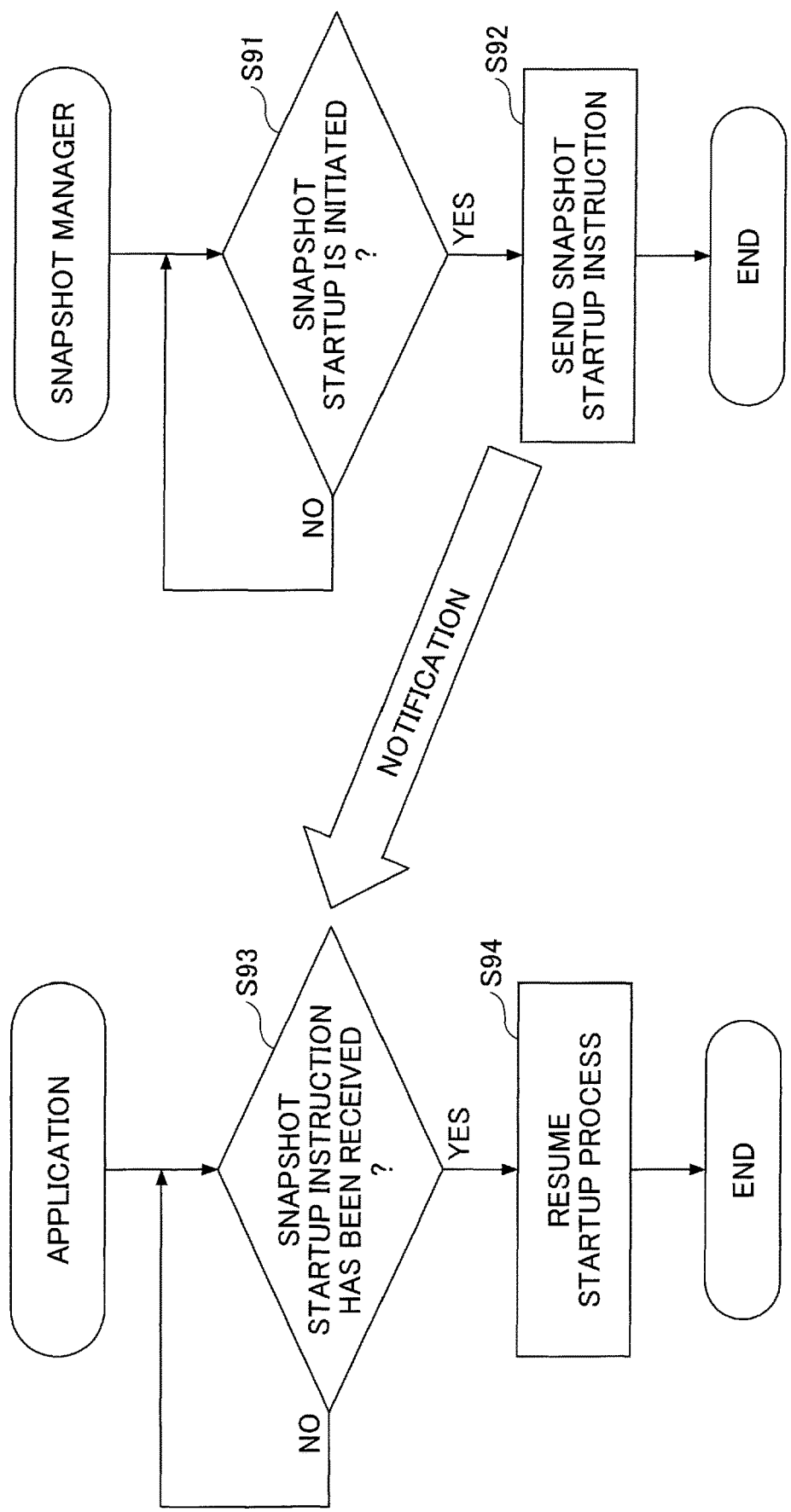
FIG. 10 is a flowchart illustrating an example of a continuation process performed in step S85.

In step S85, the continuation process is performed by a procedure illustrated in FIG. 10, for example. FIG. 10 is a flowchart illustrating an example of the continuation process performed in step S85. In S91, when the snapshot startup instructing unit 94 of the snapshot manager 58 determines that snapshot startup is initiated, the snapshot startup instructing unit 94 causes the process to proceed to step 92.

In step S92, the snapshot startup instructing unit 94 sends snapshot startup instructions to the applications 56. In step S93, the snapshot startup instruction receiving unit 90 of each of the applications 56 waits until a snapshot startup instruction is received from the snapshot manager 58.

When the snapshot startup instruction is received from the snapshot manager 58, in step S94, the startup process unit 86 of each of the applications 56 performs the continuation process in which the startup process subsequent to the point in time for snapshot creation is continued.

<Summary>

According to the present embodiment, in the operation unit 3 of the image processing apparatus 1 that performs hibernation startup, a snapshot can be preliminarily created without being affected by the presence or absence of or an enabled state or a disabled state of a peripheral device. In hibernation startup, after the preliminarily created snapshot is loaded into the memory 18, the drive consistency process is performed such that consistency of functions that depend on the environment of the image processing apparatus 1 can be maintained, and subsequently, the remaining startup process can be continued.

Accordingly, in the present embodiment, it is possible to provide the operation unit 3 that can respond to environment changes when performing hibernation startup from a preliminarily created snapshot.

Second Embodiment

According to the image processing apparatus 1 of the first embodiment, an example has been described in which snapshot creation startup is performed before shipment from a factory, and snapshot startup is performed at normal power-on after shipment from the factory. However, snapshot creation startup may be performed after shipment from the factory. Alternatively, snapshot creation startup may be selected by the user when an environment is changed, for example, when an application 56 is added or a peripheral device is added.

Furthermore, in a case where an additional application is added to (installed on) the operation unit 3 after a snapshot is created, a startup process of the additional application may be performed from the beginning to the end in the continuation process of step S85. Accordingly, the snapshot already created before the installation of the additional application may continue to be used.

Third Embodiment

In the continuation process illustrated in FIG. 10, if there are plural applications 56 whose startup processes subsequent to points in time for snapshot creation are to be continued, the order of performing the startup processes may be set as described below. It is noted that the third embodiment is similar to the first embodiment except for some parts, and thus, a description thereof will be omitted as appropriate. In the third embodiment, as in the first embodiment, the operation unit 3 of the image processing apparatus 1 performs hibernation startup.

Figure 11:
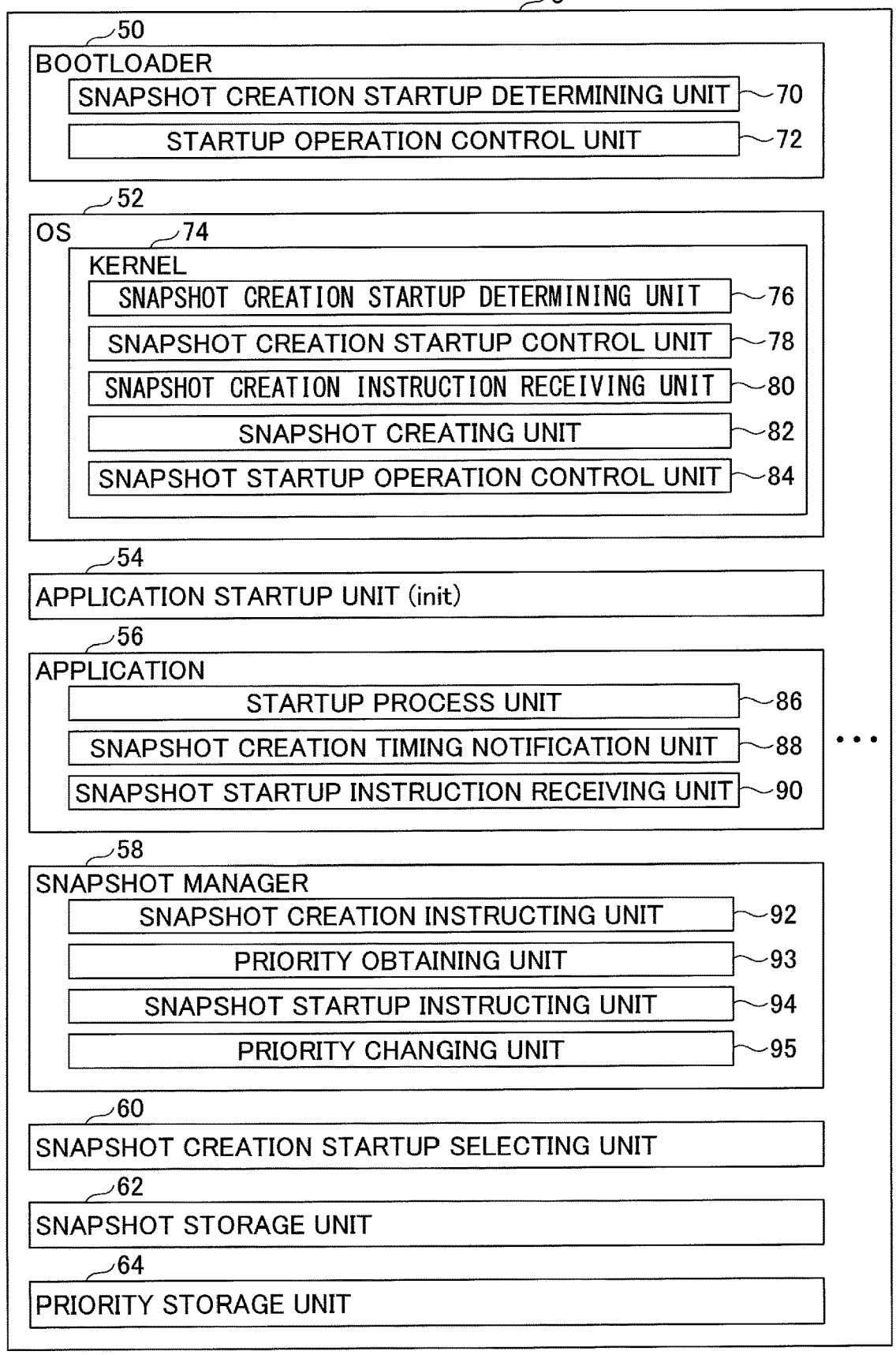
FIG. 11 is a diagram illustrating an example of a functional configuration of another example of an operation unit according to an embodiment.

FIG. 11 is a diagram illustrating a functional configuration of another example of an operation unit according to the present embodiment. As illustrated in FIG. 11, a priority storage unit 64, a priority obtaining unit 93, and a priority changing unit 95 are added to the operation unit 3 of FIG. 2.

The snapshot creation timing notification unit 88 of each of the applications 56 indicates its own priority to the snapshot manager 58 when a corresponding startup process reaches a point in time for snapshot creation. It is noted that the snapshot creation timing notification unit 88 has a priority by design, which is determined in such a manner that the dependency between applications is resolved and consistency is maintained.

As illustrated in FIG. 11, the priority obtaining unit 93 and the priority changing unit 95 are added to the snapshot manager 58 of FIG. 2. The priority obtaining unit 93 receives priority notifications from the respective applications 56. The received priorities are stored in the priority storage unit 64 in association with the applications 56. When the priority notifications are received from all the applications 56, the snapshot creation instructing unit 92 instructs the kernel 74 to generate a snapshot.

At the time of snapshot startup, the snapshot startup instructing unit 94 instructs the applications 56 to continue with the startup processes in the order in accordance with the priorities of the applications 56. The priority changing unit 95 receives a request for a priority change from the user through an application 56, and changes the priority of the application 56 stored in the priority storage unit 64.

FIG. 12 is a flowchart illustrating another example of an application startup process in step S25. In step S101, a startup process unit 86 of an "application A" initiates a startup process. The startup process unit 86 proceeds with the startup process, and stops the startup process when the startup process reaches a point in time for snapshot creation. When the startup process performed by the startup process unit 86 reaches the point in time for snapshot creation, a snapshot creation timing notification unit 88 of the "application A" sends, to the snapshot manager 58, a notification indicating its own priority "2" in step S102.

Further, in step S103, a startup process unit 86 of an "application B" initiates a startup process. The startup process unit 86 proceeds with the startup process, and stops the startup process when the startup process reaches a point in time for snapshot creation. When the startup process performed by the startup process unit 86 reaches the point in time for snapshot creation, a snapshot creation timing notification unit 88 of the "application B" sends, to the snapshot manager 58, a notification indicating its own priority "1" in step S104.

In step S105, the priority obtaining unit 93 of the snapshot manager 58 waits until the priority notifications are received from the applications 56. When the priority obtaining unit 93 receives the priority notifications from the applications 56, the priority obtaining unit 93 stores the received priorities in a priority queue of the priority storage unit 64 in step S106.

Steps S105 through S107 are repeated until the priority notifications are received from all the applications 56. When the priority notifications are received from all the applications 56, the snapshot creation instructing unit 92 instructs the kernel 74 to create a snapshot in step S108.

FIGS. 13A through 13C are diagrams illustrating examples of priority queues. The priority queues represent priorities of applications 56. For example, the priority queue illustrated in FIG. 13A is data that stores the number of applications 56 on a per-priority basis. Applications 56 with lower priority values are started first. The priority queue illustrated in FIG. 13B is data in which information such as application names or application IDs for identifying applications 56 (application identification information) is stored in association with priorities.

Further, the priority queue illustrated in FIG. 13C is data that stores priorities of applications 56 in association with startup conditions. In the example of the priority queue illustrated in FIG. 13C, an application 56 with no startup condition has a higher priority, and applications 56 with a startup condition have lower priorities. Thus, in the example of FIG. 13C, the application 56 with no startup condition is started first, and subsequently, the applications 56 with a startup condition are started.

Figure 14:
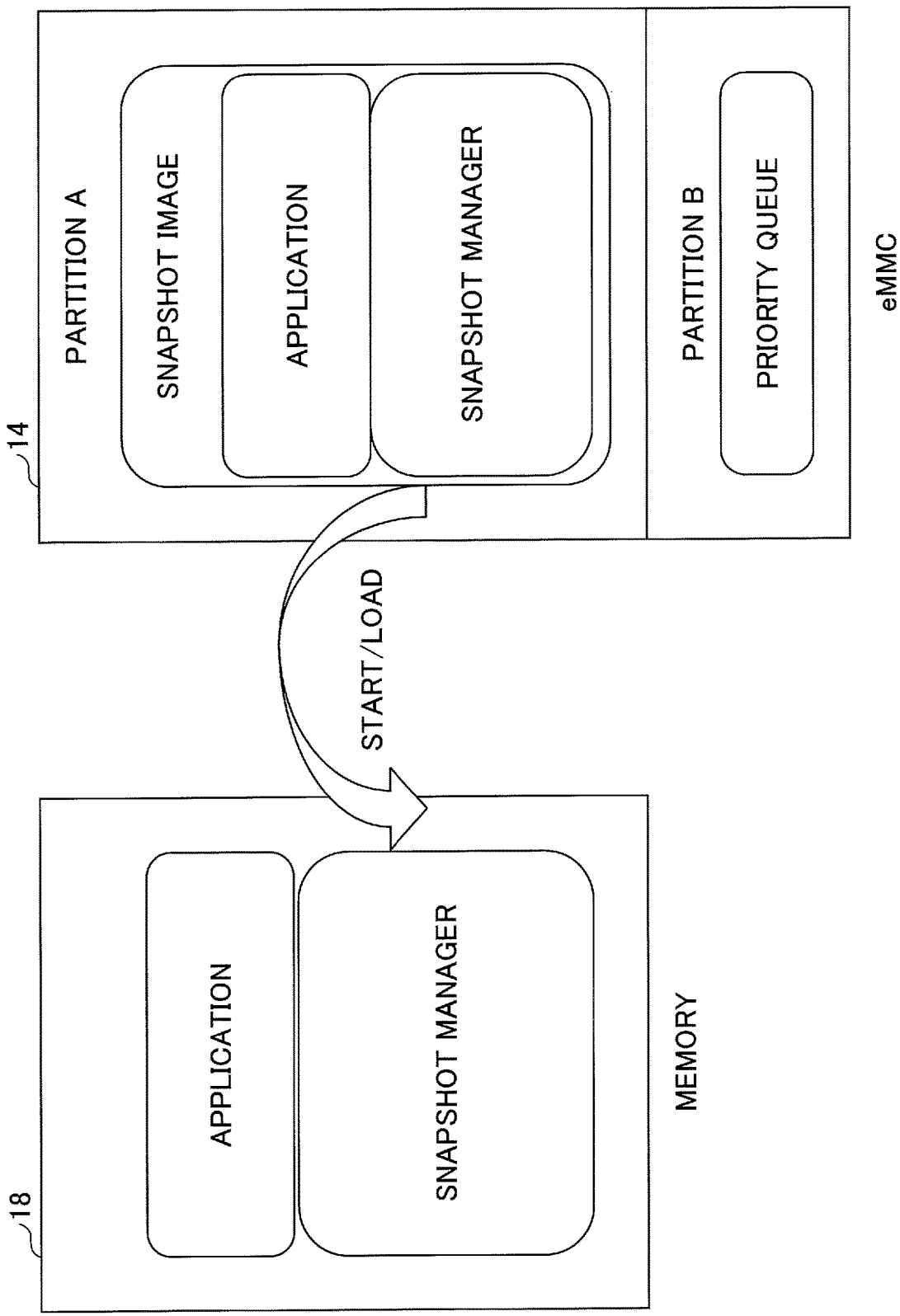
FIG. 14 is a diagram illustrating a configuration example of a snapshot image and a priority queue stored in an eMMC.

FIG. 14 is a diagram illustrating a configuration example of a snapshot image and a priority queue stored in the eMMC. The snapshot image includes applications 56 and the snapshot manager 58 stored in the eMMC 14 when the snapshot is created by the snapshot creating unit 82.

The priority queue illustrated in FIG. 13 is not included in the snapshot image, and is stored in a partition different from a partition of the snapshot image in the eMMC 14. At the time of snapshot startup, the snapshot image including the applications 56 and the snapshot manager 58 stored in the eMMC 14 is loaded into the memory 18. At the time when the snapshot image is loaded into the memory 18, the priority queue is not required to be loaded in the memory 18.

FIG. 15 is a flowchart illustrating another example of a continuation process performed in step S85. In the continuation process illustrated in FIG. 15, the snapshot startup instructing unit 94 of the snapshot manager 58 reads the priority queue from the eMMC 14 and loads the priority queue into the memory 18. In steps S121 through S128, in accordance with the priority queue, the snapshot startup instructing unit 94 sends startup process resumption notifications to applications 56 in descending order of priorities. Upon reception of the resumption notifications, the startup process unit 86 of each of the applications 56 resumes a startup process subsequent to a point in time for snapshot creation. Upon completion of the resumed startup process, each of the application 56 returns a completion notification to the snapshot manager 58.

The snapshot manager 58 repeatedly transmits a resumption notification and receives a completion notification in steps S121 through S128, until the snapshot manager 58 receives completion notifications from all the applications 56. The example of FIG. 15 indicates that a priority of an "application B" is higher than a priority of an "application A". Therefore, the snapshot startup instructing unit 94 transmits a resumption notification to the "application B" prior to the "application A".

In a case where there are plural applications 56 with the same priority, the snapshot startup instructing unit 94 may simultaneously transmit resumption notifications to the plural applications 56, and startup processes may be simultaneously performed. Further, in order to reduce the load of the CPU 22, the number of applications 56 whose resumed startup processes are simultaneously performed may be limited. Alternatively, resumption notifications may be transmitted at different times in a random manner or based on a predetermined condition (such as time required to complete the startup processes and a memory capacity).

FIG. 16 is a flowchart illustrating an example of a process for a priority change. In steps S131 and S132, the priority changing unit 95 of the snapshot manager 58 receives, from the user, a request for changing a priority of an "application A" to "1". In step S133, based on the request for changing the priority of the "application A" to "1", the priority changing unit 95 changes the priority of the "application A" stored in the priority queue of the priority storage unit 64. Accordingly, it becomes possible for the snapshot startup instructing unit 94 to transmit startup process resumption notifications based on the updated priority queue.

According to the third embodiment, at the time of hibernation startup from a preliminarily created snapshot, the order of resuming startup processes can be adjusted based on priorities of the applications 56, which have dependencies on the startup order. Further, according to the third embodiment, at the time of hibernation startup from a preliminarily created snapshot, the startup of a specific application 56 can be prioritized. Accordingly, for example, an application 56 that controls a home screen can be prioritized and started first, thereby allowing the user to feel as if startup time is shortened.

According to at least one embodiment of the present invention, it is possible to flexibly respond to environment changes at the time of hibernation startup from a preliminarily created snapshot. Although the embodiments of the present invention have been specifically described above, the present invention is not limited to the above-described embodiments. Various modifications and variations may be made without departing from the scope of the present invention. For example, the image processing apparatus 1 is merely an example.

Needless to say, there may various system configuration examples in accordance with applications and purposes.

The snapshot creation startup selecting unit 60 is an example of a selecting unit described in the claims. The bootloader 50, the OS 52, and the application startup unit 54 are examples of startup units. The snapshot creation instructing unit 92 of the snapshot manager 58 is an example of a creation instructing unit. The snapshot creating unit 82 of the kernel 74 is an example of a creating unit.

The snapshot storage unit 62 is an example of a memory. The snapshot startup instructing unit 94 of the snapshot manager 58 is an example of a startup instructing unit. The priority obtaining unit 93 is an example of a priority obtaining unit. The priority changing unit 95 is an example of a priority changing unit.

What is claimed is:

1. An information processing apparatus for performing hibernation startup, the information processing apparatus comprising:
   a selecting unit configured to select snapshot creation startup or snapshot startup;
   a startup unit configured to initiate startup processes of one or more applications when the snapshot creation startup is selected;
   the one or more applications, configured to send notifications after the startup processes have progressed to respective points in time for snapshot creation, the respective points in time being set in the startup processes;
   a creation instructing unit configured to send an instruction to create a snapshot after receiving the notifications from all of the one or more applications;
   a creating unit configured to create the snapshot based on the instruction;
   a memory configured to store the snapshot; and
   a startup instructing unit configured to read the snapshot stored in the memory when the snapshot startup is selected, and configured to send, to the one or more applications, an instruction to resume the startup processes subsequent to the respective points in time, so as to complete the startup processes of the one or more applications.

2. The information processing apparatus according to claim 1, further comprising a priority obtaining unit configured to obtain priorities of the one or more applications when the snapshot creation startup is selected, wherein the startup instructing unit completes the startup processes of the one or more applications by sending, to the one or more applications, the instruction to resume the startup processes subsequent to the respective points in time in order based on the priorities of the one or more applications obtained at a time of the snapshot creation startup.

3. The information processing apparatus according to claim 2, further comprising a priority changing unit configured to change the priorities of the one or more applications obtained at a time of the snapshot creation startup, based on a change request received from a user.

4. The information processing apparatus according to claim 1, wherein the startup unit includes a bootloader, wherein the bootloader performs, for a preset device of one or more devices that are subjected to a device process during a boot process, control that does not detect the preset device when the snapshot creation startup is selected, and performs control that detects the preset device when the snapshot startup is selected.

5. The information processing apparatus according to claim 1, wherein the startup unit includes an operating system, wherein the operating system performs, for a preset device driver of one or more device drivers that are subjected to a device driver process during an operating system startup process, control that does not enable the preset device driver when the snapshot creation startup is selected, and performs control that enables the preset device driver when the snapshot startup is selected.

6. The information processing apparatus according to claim 5, wherein the preset device driver of the one or more device drivers that are subjected to the device driver process during the operating system startup process has functions, and the operating system performs control that does not enable at least one of the functions when the snapshot creation startup is selected, and performs control that enables all of the functions when the snapshot startup is selected.

7. The information processing apparatus according to claim 1, wherein a startup process of an additional application, not installed on the information processing apparatus when the snapshot creation startup is selected, is performed after the snapshot startup is selected and the instruction to resume the startup processes is sent.

8. The information processing apparatus according to claim 1, wherein the information processing apparatus functions as an operation unit of an image processing apparatus.

9. A startup method performed by an information processing apparatus for performing hibernation startup, the startup method comprising:

selecting snapshot creation startup or snapshot startup;

initiating startup processes of one or more applications when the snapshot creation startup is selected;

sending notifications after the startup processes have progressed to respective points in time for snapshot creation, the respective points in time being set in the startup processes;

sending an instruction to create a snapshot after receiving the notifications from all of the one or more applications;

creating the snapshot based on the instruction;

storing the snapshot in a memory; and reading the snapshot stored in the memory when the snapshot startup is selected, and sending, to the one or more applications, an instruction to resume the startup processes subsequent to the respective points in time, so as to complete the startup processes of the one or more applications.

* * * * *